United States Patent [19]
Williams

[11] Patent Number: 5,332,178
[45] Date of Patent: Jul. 26, 1994

[54] COMPOSITE WING AND MANUFACTURING PROCESS THEREOF

[75] Inventor: Sam B. Williams, Bloomfield Hills, Mich.

[73] Assignee: Williams International Corporation, Walled Lake, Mich.

[21] Appl. No.: 894,455

[22] Filed: Jun. 5, 1992

[51] Int. Cl.$^5$ ............................................. B64C 3/20
[52] U.S. Cl. .................. 244/123; 244/117 R; 416/226
[58] Field of Search .................. 244/123, 124, 117 R; 416/226, 229 R, 232, 233

[56] References Cited

U.S. PATENT DOCUMENTS

| | | | |
|---|---|---|---|
| 3,028,292 | 4/1962 | Hinds | 244/123 |
| 3,229,935 | 1/1966 | Bellanca | 244/123 |
| 3,768,922 | 10/1973 | Dixon | 416/226 |
| 3,779,487 | 12/1973 | Ashton et al. | 244/123 |
| 3,962,506 | 6/1976 | Dunahoo | 244/123 |
| 4,188,171 | 2/1980 | Baskin | 416/226 |
| 4,206,895 | 6/1980 | Olez | 244/123 |

FOREIGN PATENT DOCUMENTS 2032283  3/1971  Fed. Rep. of Germany ...... 244/123

Primary Examiner—Michael S. Huppert
Assistant Examiner—Anne E. Bidwell
Attorney, Agent, or Firm—Lyman R. Lyon

[57] ABSTRACT

A composite wing for an aircraft comprises a plurality of elongated hollow one-piece composite spars arranged in juxtaposed generally parallel relation in an array defining an airfoil with a composite skin disposed about said assembled spars.

1 Claim, 4 Drawing Sheets

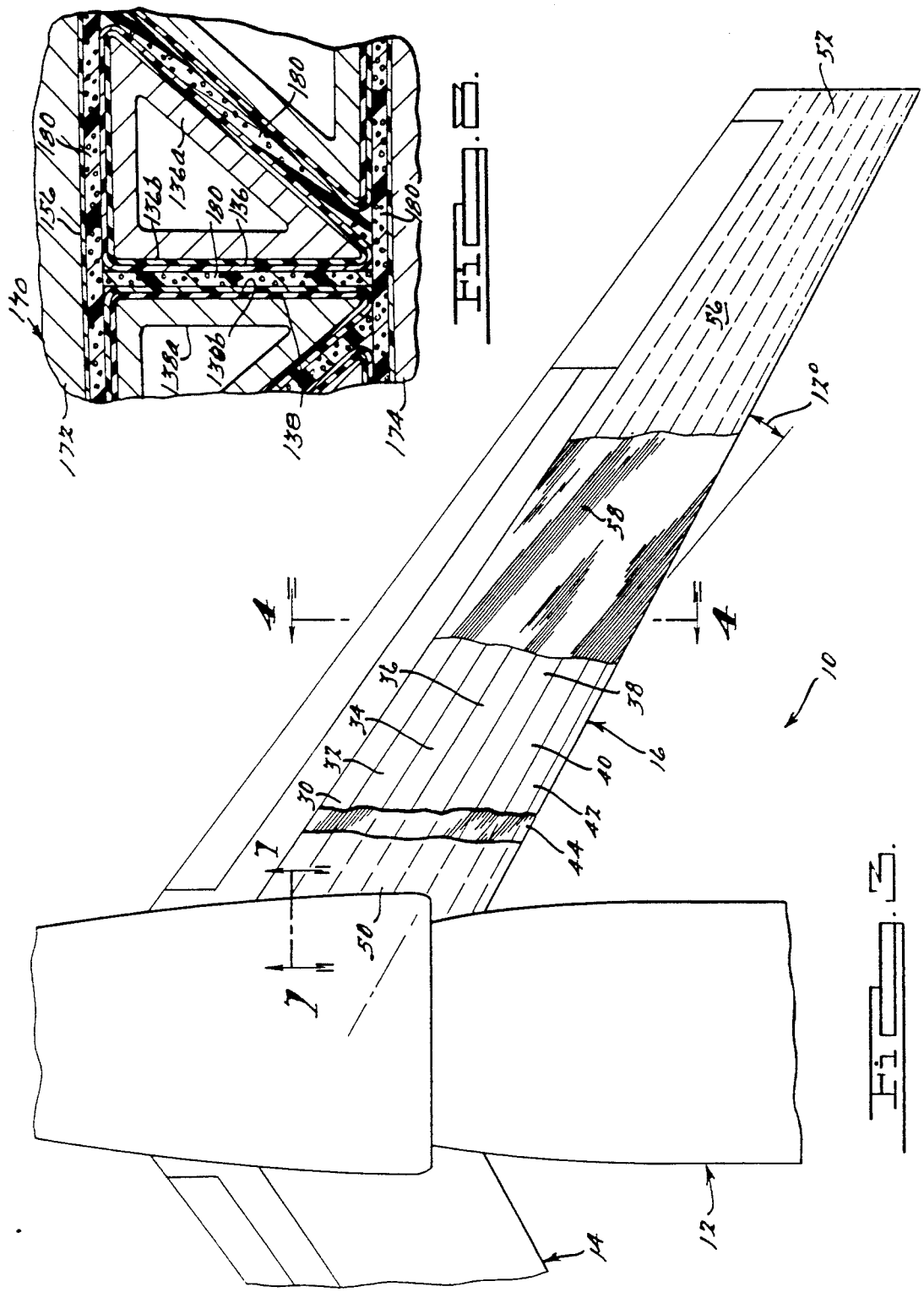

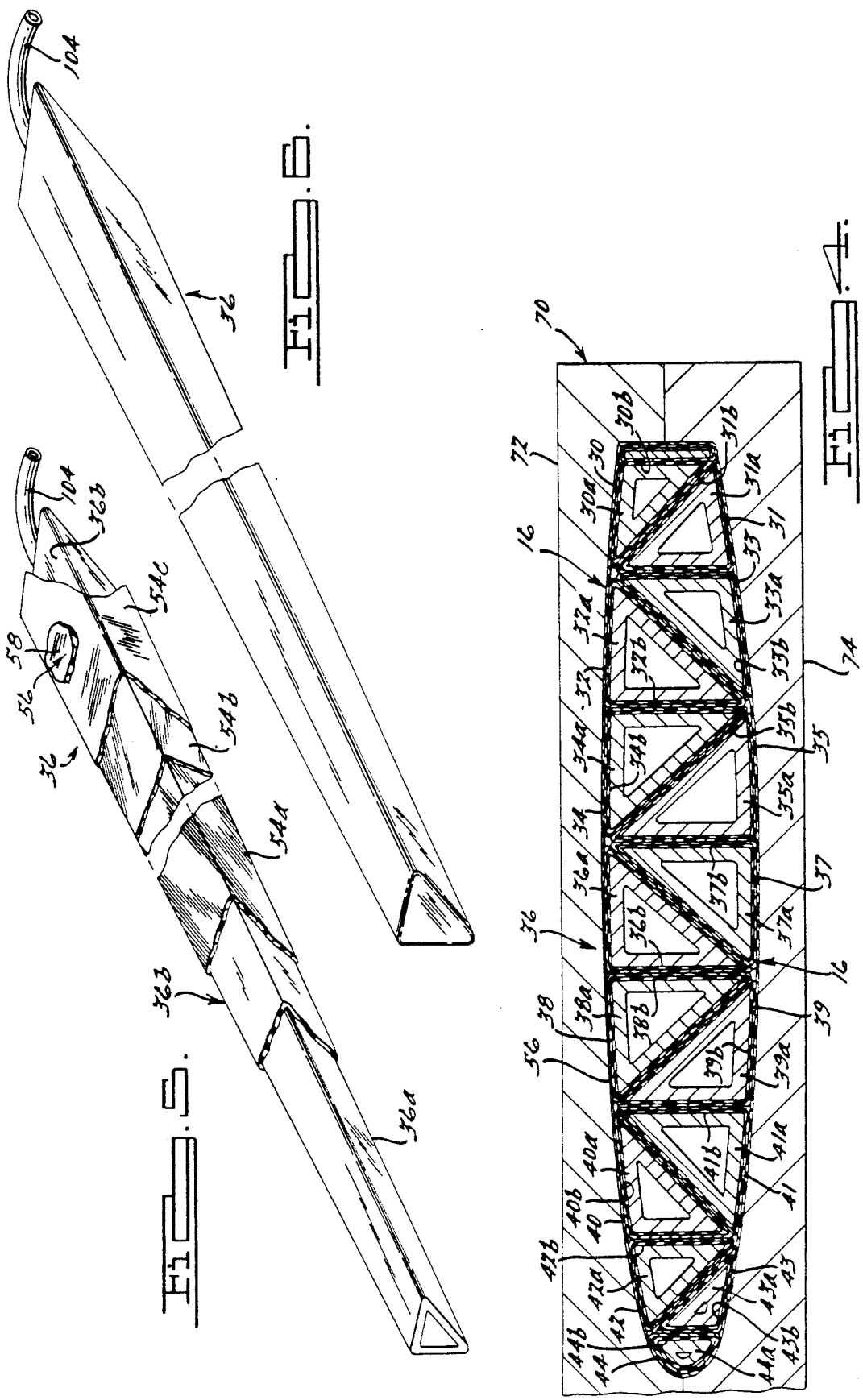

COMPOSITE WING AND MANUFACTURING PROCESS THEREOF

BACKGROUND OF THE INVENTION

Conventional aircraft wing construction generally comprises one or more spars that extend laterally relative to the longitudinal axis of the air frame for the support of a plurality of longitudinally extending laterally spaced ribs that define the shape of the air foil. Vertical web portions of the spars carry shear loads imposed on the wing and upper and lower wing skins act as flanges that sustain the wing under bending and torsional loads.

A variation on the aforesaid conventional wing construction is taught in Barkley, U.S. Pat. No. 2,122,709. Barkley discloses a wing constructed of a plurality of laterally extending webs that support the wing skins in a manner that makes it unnecessary to utilize longitudinally extending ribs. However, the Barkley wing configuration, like the conventional spar and rib construction, does not accommodate the use of composites.

Another problem addressed by the present invention is a phenomena known as "aeroelastic divergence". Aeroelastic divergence occurs when a forward swept wing is bent upwardly due to high angles of attack or gust loads. Because of the forward sweep geometry, the resultant torsional deflection increases the angle of attack of the wing. The increase in angle of attack of the wing increases aerodynamic load still further causing yet additional increase in the angle of attack. This self-propagating "divergence" can lead to structural damage or failure of the wing. To minimize the aforesaid phenomena the elastic configuration of the wing must be altered whereby an increase in aerodynamic load twists the wing in a direction so as to reduce the angle of attack of the wing thereby reducing aerodynamic load.

Yet another problem presented by known wing constructions, and addressed by the present invention, is the difficulty in integrating multiple fuel tanks into the wings of an aircraft.

SUMMARY OF THE INVENTION

The aforesaid problems are solved by utilizing a unique fiber reinforced composite spar configuration coupled with orientation of fibers within a composite skin. The wing comprises a plurality of discrete, tapered, hollow, triangular, fiber reinforced composite spars, each having controlled fiber orientation. The spars are bonded to one another to define the wing air foil. Each spar extends from the wing root to the wing tip. Composite skins having fibers orientated at a predetermined angle with respect to the wing's forward sweep angle are bonded to the spars. Vertical portions of each spar are wound with fibers at controlled angles relative to the vertical thereby to maximize the spar's ability to carry vertical shear loads to which the wing is subjected. Fiber orientation in the wing skins controls aeroelastic divergence. The number of fibers in the spar and skin laminates is increased from tip to root to accommodate increasing bending and torsional loads to which the wing is subjected. The spars also function as discrete fuel tanks which simplifies fuel management.

More specifically, elongated triangular mandrels are used as tools for forming individual spars of hollow, triangular cross section. The spars are bonded to one another to define the shape of the airfoil. The rearmost spar provides for mounting of the wing ailerons and flaps as well as providing a conduit for control circuitry for the flap and aileron actuators, electric, hydraulic or mechanical drives, and auxiliary control systems. The forward spar is used for electric cables, wing tip lights, and leading edge de-icing systems.

The first step in forming an individual spar is to cover its mandrel with a thin elastomeric bladder. The bladder completely encloses the mandrel including the tip and root ends thereof and includes a pressurizing tube at one end thereof.

Resin impregnated fibers are thereafter wound on the bladder enclosed mandrel in a manner that closes off the wing tip but leaves the root end of the mandrel uncovered.

A plurality of completed spars including their mandrels are then assembled with the spars in contact with each other or with a foam or honeycomb layer interposed therebetween in an array that defines the wing's airfoil. The spars are supported in fixtures employing locating lugs or holes at the root end and the tip end of each mandrel.

Resin impregnated fibers are then laid up around the assembly of previously formed spars to form the outer wing skin.

After the composite skin is applied to the assembly of spars, a two piece wing-shaped cavity tool is clamped over the spar assembly. The cavity tool precisely defines the upper and lower airfoil surfaces and tip of the wing. The tool halves are sealed together allowing the enclosed cavity to be evacuated by a vacuum pump to remove any air pockets in the resultant composite skin. Heat is applied to the cavity tool to expedite curing of the resin system. Concomitantly, air under pressure is supplied to interior of the bladders surrounding each mandrel so as to bias the composite spars against one another and against the outer skin, in turn, forcing the outer skin into intimate contact with the cavity mold ensuring that the outer skin is accurately formed against the cavity mold as well as insuring a strong bond between adjacent spars. If desired, the bladders may be bonded to the interior surface of the composite spars so as to form a permanent part of the spar structure as insurance against fuel leakage. In this case, a suitable "parting" material is applied to the mandrel surfaces, as opposed to the exterior surface of the bladder. Since there is a taper to the airfoil and to the individual spars from root to tip, the bladder portion over the root end of each mandrel need be merely cut away to effect removal of the mandrel. The cavity mold is removed by separating it into its two halves.

Yet another advantage to the aforesaid spar configuration is that easy access is available to the interior of each spar for ultrasonic inspection of spar integrity. Such inspection through the open root end of the spars is permitted not only at the time of manufacture but during the life span of the composite wing. This is an important design feature, since no access panels are required under the wing for inspection purposes, reducing weight and improving structural integrity.

Typically, an aircraft using the wing construction of the present invention will have its main landing gear mounted to the fuselage rather than to the wing in order to maximize design simplicity and minimize weight and reduce manufacturing cost.

BRIEF DESCRIPTION OF THE DRAWINGS

FIG. 3 is a view, similar to FIG. 2, showing a wing broken open for clarity.

FIG. 4 is a view of a wing along the line 4—4 of FIG. 3 with the wing enclosed in a mold during fabrication.

FIG. 5 is a view of a mandrel with the bladder and successive windings thereon broken away for clarity taken along the line 5—5 of FIG. 3.

FIG. 6 is a view of a finished spar.

FIG. 8 is a fragmentary, cross-sectional view similar to FIG. 4, of a second embodiment of the invention.

DETAILED DESCRIPTION OF THE PREFERRED EMBODIMENT OF THE INVENTION

Figure 2:
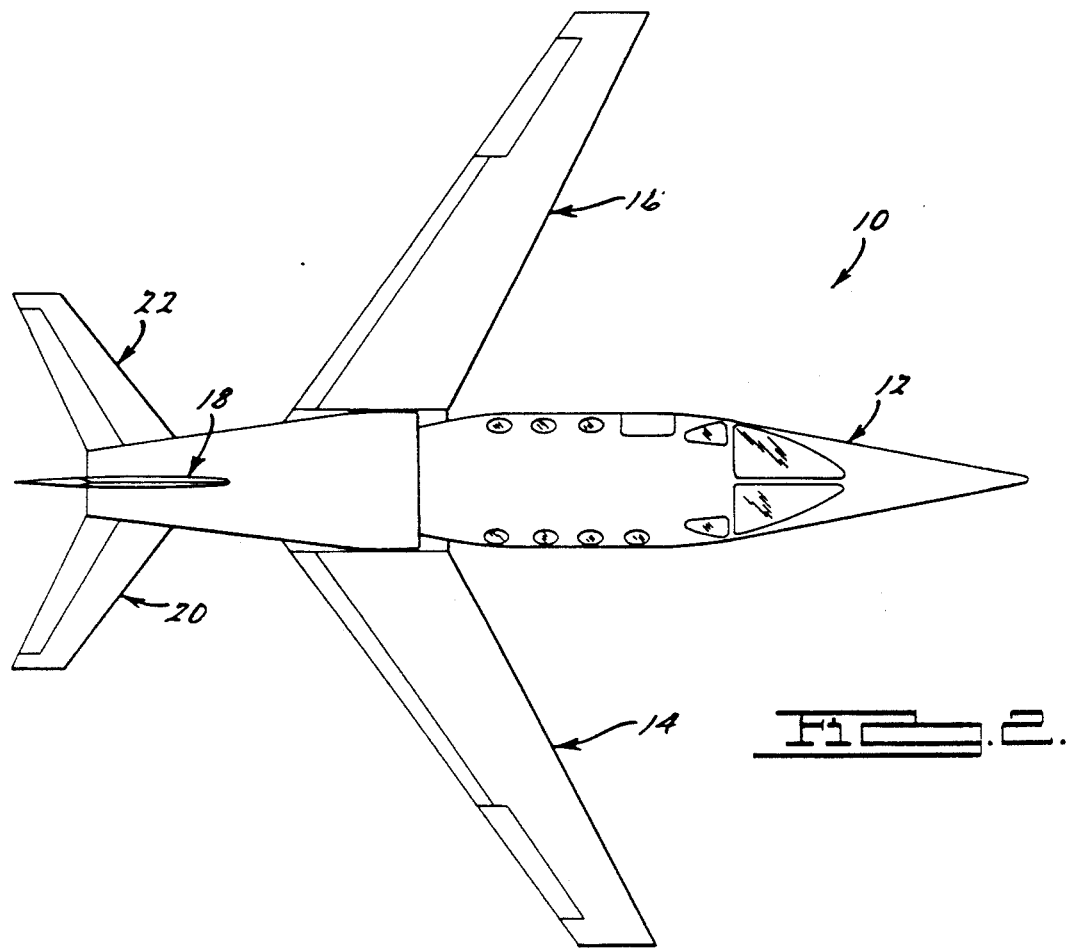
FIG. 2 is a top plan view of the aircraft of FIG. 1.
Figure 1:
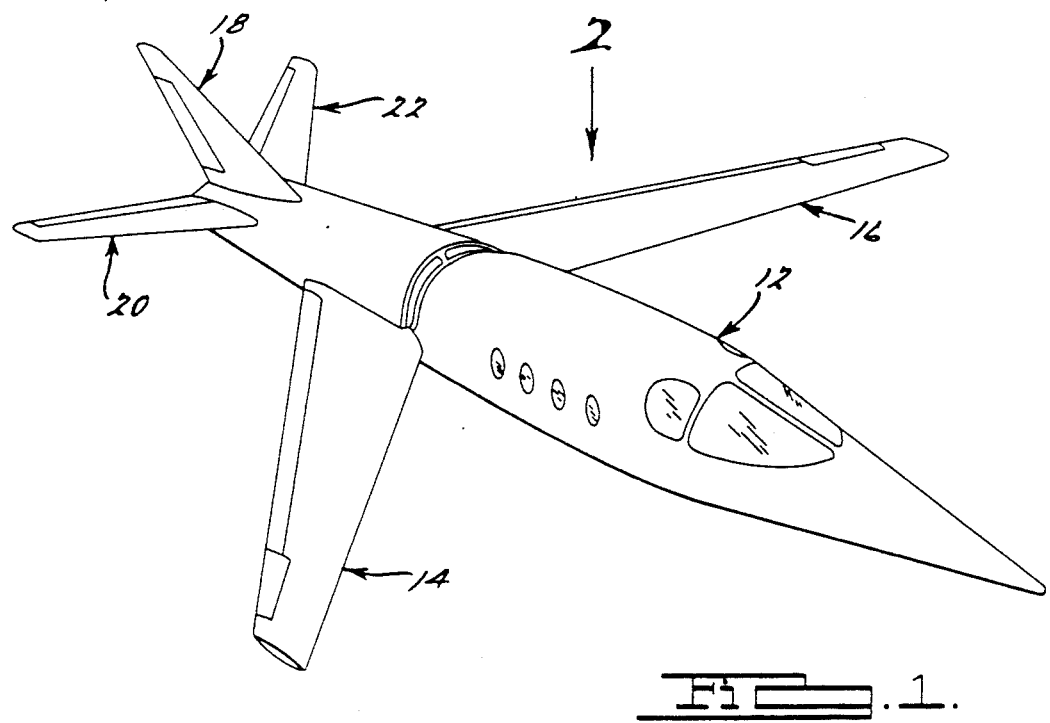
FIG. 1 is a perspective view of a high subsonic aircraft employing forward swept wings in accordance with the present invention.

As seen in FIGS. 1 and 2 of the drawings, an aircraft 10, in accordance with a preferred embodiment of the instant invention, comprises a fuselage 12 having forward swept wings 14 and 16 extending laterally therefrom. The aircraft 10 is provided with a conventional vertical stabilizer 18 and horizontal stabilizers 20 and 22.

As seen in FIGS. 3 and 4 of the drawings, the wings 14 and 16 comprise a plurality of laterally extending spars 30 through 44, of generally triangular cross section, that taper from a wing root area 50 to wing tip area 52. The spars 30 through 44 comprise hollow fiber reinforced composite structural members that are laid up on individual mandrels 30a through 44a having bladders 30b through 44b thereabout, as will be described. The number and orientation of fibers 54a, 54b and 54c, for example, resin impregnated carbon fibers, that comprise each spar 30 through 44, are tailored to the location of the spar in the wings 14 and 16 and to the loads to which the spar is subjected. The fibers 54a, 54b and 54c are preferably wound at an angle to a plane extending at a right angle to the longitudinal axis of the spars 30–44 thereby to permit relative movement between the fibers 54a, 54b and 54c and radial expansion of the spars 30–44 upon inflation of the bladders 30b–40b. It is contemplated that the number of fiber windings 54a, 54b and 54c comprising the spars 30–44 will decrease from the wing root 50 to the wing tip 52 to minimize weight consistent with specific loading requirements.

As seen in FIG. 4, the spars 30 through 44 are both bonded to one another and encapsulated by a wing skin 56 to define the shape of the wing 16. The fiber reinforced composite wing skin 56 is formed about the assembled spars 30 through 44 by winding resin impregnated fibers 58 directly onto the outer surface of the assembled spars 30–44.

Aeroelastic divergence and other load requirements are controlled and satisfied by fiber orientation in the skin 56. Specifically, as best seen in FIG. 3, the fibers 58 that comprise the wing skin 56 are wound at an angle of 12° relative to the spar 38, thereby to minimize aeroelastic divergence of the forward swept wings 14 and 16 due to upward deflection of the wings at high angles of attack or due to gust loads.

It is to be noted that each of the wing spars 30 through 43 constitutes a sealed enclosure which can be utilized as a fuel tank that extends from the wing root 50 to the wing tip 52.

Figure 7:
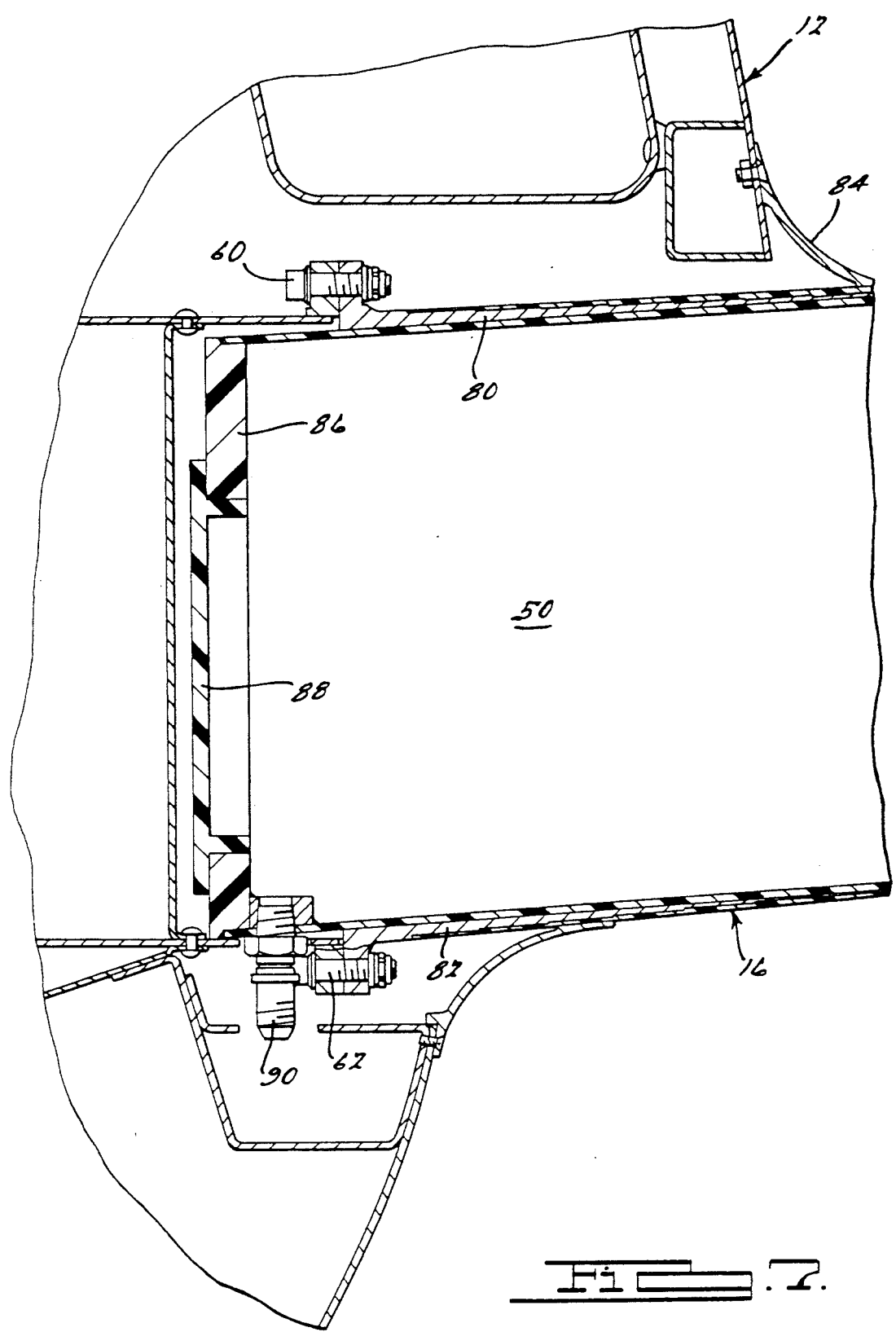
FIG. 7 is a view of the wing attachment system at the root thereof.

As best seen in FIG. 7, the wing 16 is secured to the fuselage 12 by a plurality of wing bolts 60 and 62 at the upper and lower extremities of the wing 16, respectively. The bolts 60 and 62 extend through flanges 80 and 82 that are bonded to the wing skin 56 at the root end 50 of the wing 16 to provide for attachment to the aircraft fuselage 12. If the wing 16 protrudes into the fuselage 12 for mounting, as shown, a second flange 84 can be bonded to the skin 54 where the wing 16 intersects the fuselage 12. The flange 84 may be used as a structural element of the wing or alternatively as a wing fairing.

The inner end of each of the spars 30–43 is closed by a spar closure member 86 having an inspection plate 88 therein. Each of the spars 30–43 can be used as a fuel tank by providing a fuel connector 90 on the underside thereof to facilitate drawing of fuel from the tank. Because of wing taper and dihedral, such a connector 90 at the bottom of each spar is capable of drawing substantially all of the fuel from each tank.

As seen in FIG. 8, a modified embodiment of the invention comprises spars 136 and 138 which are laid up about mandrels 136a and 138a, and bladders 136b and 138b. Only the spars 136 and 138 are shown, as representative of all of the wing spars, for purposes of simplicity. Layers of resin impregnated unpolymerized structural foam or honeycomb 180 are placed between the individual spars 136 and 138, and between the spars 136 and 138 and the fibers forming outer wing skin 156, to enhance stiffness and absorb tolerance deviations in the spars 136–138. The foam layers 180 are compressed upon expansion of the bladders 136b–138b and closure of mold sections 172 and 174 of a mold 170. Thereafter, resin impregnated in the foam 180 is polymerized concomitantly with polymerization of the resin impregnated fibers comprising the spars 136 and 138.

As best seen in FIG. 5, manufacture of wings 14 and 16 is initiated by first preparing individual triangular mandrels 30a through 44a, for each of the spars 30 through 44, respectively. The mandrel 36a is illustrated in FIG. 5 and will be discussed in detail hereinafter as exemplary of the other mandrels.

The mandrel 36a is covered by thin elastomeric bladder 36b that encloses the entire mandrel 36 including the tip and root ends thereof. An inflator tube 104 extends from one end of the bladder 36b for pressurizing the bladder, as will be described. After treatment of the bladder 36b with a parting agent, the resin impregnated fibers 54a, 54b and 54c are wound, in directions dictated by design requirements, directly on the exterior surface of the bladder 36b disposed about the mandrel 36a. Alternatively, resin may be applied to the fibers 54a, 54b and 54c after winding thereof over the bladder 36b. Moreover, the parting agent may be omitted from the outer surface of the bladder 36b in which case the bladder 36b will be bonded to the interior of the spars 36 providing supplemental internal sealing therefore.

After winding of the resin impregnated fibers 54a, 54b and 54c on the bladder covered mandrel 36a, but prior to curing of the resin thereon, the bladder and fiber enclosed mandrels 30a through 44a are assembled as seen in FIG. 4, to define the airfoil of the wing 16. The mandrels 30a through 44a may be supported in fixtures (not shown) employing, for example, locating lugs or holes for the acceptance of the root end 50 and the tip end 52 of each mandrel.

Thereafter, as best seen in FIGS. 3 and 4, the resin impregnated fibers 58 are wound around the assembled mandrel supported spars 30 through 44 so as to form the composite outer wing skin 56. After the fibers 58 that comprise composite wing skin 56 are wound about the assembled spars 30 through 44, the assembly is placed in a wing-shaped mold 70 comprising an upper section 72 and a lower section 74, the internal surfaces of which precisely define the upper and lower airfoil surfaces of the wing as well as the wing tip 52. The mold sections 72 and 74 are clamped together and sealed allowing the enclosed cavity to be evacuated of air by a vacuum pump, not shown, to preclude the formation of air pockets in the composite skin 56. Concomitantly, air pressure is applied to the bladders 30b through 44b which bias the triangular and "D"-shaped composite spars 30 through 44 against one another and against the outer skin 56 thereby forcing the outer skin 56 into intimate contact with the mold 70. This procedure ensures a strong bond between the adjacent spars 30 through 44 and between the spars 30 through 44 and the outer wing skin 56. The aforesaid procedure also ensures that the outer wing skin 56 is precisely formed to the interior contour of the mold 70.

After heating and curing of the resin impregnated fibers of the wings 14 and 16, the mold 70 is removed by separating it into its two halves 72 and 74. The mandrels 30a through 44a are then withdrawn from the spars 30 through 44. The foregoing procedure is rendered practical by the taper to the individual mandrels 30a through 44a from wing root to tip.

It is to be noted that the assembled spars 30 through 44 are open at their root ends thereby to provide easy access for ultrasonic inspection of the composite structure and bond integrity. Moreover, inspection of each spar 30 through 44 is possible not only at the time of manufacture but during the life span of the composite wing due to the inspection plates 88. This is an important design advantage, since no access panels are required under the wing for inspection purposes, reducing weight and improving structural integrity.

It is also to be noted that the separate fuel tanks defined by the spars 30 through 44 run from wing root 50 to wing tip 52 so as to optimize management of fuel to minimize both lateral and fore and aft shift of the center of gravity of the aircraft as fuel is consumed. For example, the fore and aft fuel tanks can be drained simultaneously causing very little shift in the center of gravity of the aircraft 10. When these tanks are nearly empty, the next adjacent tanks can be drained simultaneously, etc. The effect of sloshing of the fuel from root to tip is also minimized since it occurs only in the tanks that are partially empty. If necessary, a baffle system can be inserted from the root end of each tank to minimize lateral flow of fuel during roll maneuvers.

The fiber used in the composite wing of the present invention is normally carbon fiber. However, other fibers such as Kevlar and glass may be used as dictated by the application. Various lightning strike provisions may also be included, such as conductive material integrated into the skin; for example, aluminum fibers or mesh. Conventional polyester or epoxy resins are used to bond the fibers 53 and 54.

From the foregoing it should be apparent that the vertical walls of each spar provide webs for carrying shear loads between the upper and lower skins. The "truss" that results from the triangular pattern sustains the airfoil shape under bending and torsional loads in a manner normally accomplished by laterally spaced wing ribs.

The integrated spars provide a like number of separate fuel tanks that run from root to tip and provide for management of the fuel load.

The inner end of each spar or fuel tank is sealed with a plug that can be removed for inspection purposes. The wing extension in each spar, inboard of the wing-mounting flange, has a fuel connection on the underside to accomplish the previously mentioned fuel management. Because of wing taper and dihedral, such a port at the bottom of each triangular tank is capable of drawing substantially all of the fuel from each tank.

Aeroelastic divergence is controlled by tailoring the stiffness and flex pattern of the wing whereby an increase in aerodynamic load twists the wing in a direction to reduce the angle of attack thereby reducing aerodynamic load. This tailored stiffness is accomplished by the orientation of the fibers within the composite skin whereby the majority of the fibers in the wing skin are oriented approximately 12° from the wing forward-sweep angle as measured from, for example, the quarter cord line of the airfoil cross section. In a preferred embodiment the fibers in the wing skins and in the portions of the wing spars that bond to the wing skins are predominantly wound or laid up in the 12° direction. A portion of the fibers in the wing skin are oriented in other directions to provide the necessary strength for carrying loads in other directions. The vertical portions of each spar are wound or laid up predominantly with 45° angle fibers in both directions to carry shear loads. The number of layers of coated fiber or tape windings or laid-up woven fabric increases from tip to root to accommodate the increasing bending and torsional loads.

While the preferred embodiment of the invention has been disclosed, it should be appreciated that the invention is susceptible of modification without departing from the scope of the following claims.

I claim:

1. A forwardly swept composite wing for an aircraft comprising:

a plurality of discrete elongated hollow one-piece composite spars having hollow interiors, respectively, extending from wing root to wing tip, said spars being arranged in juxtaposed generally parallel relation in an array defining an airfoil, each of said spars having at least one surface defining a portion of the airfoil and a vertical surface, said spars being arranged so as to present said vertical surfaces to one another in close juxtaposed relation, and a composite skin bonded to the one surface of each of said spars, said composite skin being reinforced by fibers wound about said spar assembly at a forwardly swept angle of approximately 12° to a laterally extending central axis of the wing to minimize aeroelastic divergence of said wing.

* * * * *